R. M. CAUFFMAN.
PASTEURIZING APPARATUS.
APPLICATION FILED FEB. 16, 1914.

1,115,173.

Patented Oct. 27, 1914.

Witnesses:
Lela W. Cook.
Hazel Myers.

Robert M. Cauffman
INVENTOR.
By George G. Oetach,
ATTORNEY.

UNITED STATES PATENT OFFICE.

ROBERT M. CAUFFMAN, OF THREE RIVERS, MICHIGAN.

PASTEURIZING APPARATUS.

1,115,172. Specification of Letters Patent. Patented Oct. 27, 1914.

Application filed February 16, 1914. Serial No. 819,367.

*To all whom it may concern:*

Be it known that I, ROBERT M. CAUFFMAN, a citizen of the United States, residing at Three Rivers, in the county of St. Joseph and State of Michigan, have invented certain new and useful Improvements in Pasteurizing Apparatus, of which the following is a specification.

The invention relates to a pasteurizing apparatus designed particularly for the pasteurizing of milk, wherein the milk containing bottles are placed within the apparatus in considerable numbers and the contained fluid brought to the proper degree of heat.

The main object of the present invention is the provision of a pasteurizing device, wherein the pasteurizing agent is continually re-utilized, the construction contemplating its temporary storage in a manner to preserve to a considerable extent its heat or cold as the case may be, whereby from such conservation a material saving in time and economy in operation may be gained.

The invention in the preferred form of details will be described in the following specification, reference being had particularly to the accompanying drawings, in which:—

Figure 1:
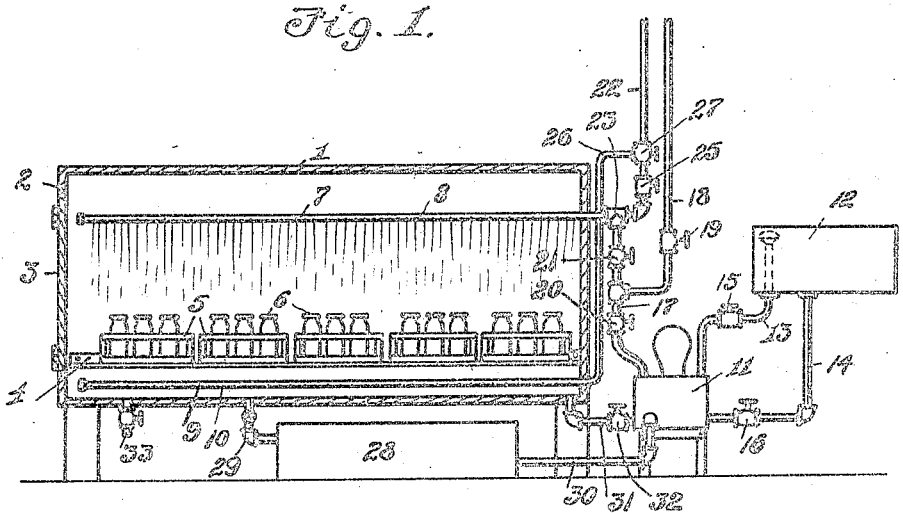
Figure 2:
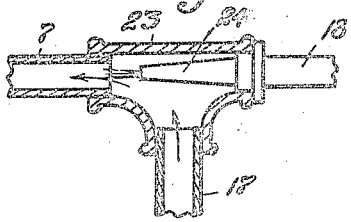

Figure 1 is a view in section, partly in elevation, illustrating the apparatus. Fig. 2 is an enlarged sectional view illustrating the medium for bringing the water to the proper degree of heat.

Referring particularly to the accompanying drawings, the improved pasteurizing apparatus includes a closed casing or tank 1 having an opening 2 at one end thereof adapted to be closed by a door 3. Brackets 4 are secured in spaced relation to each other and to the bottom of the tank on the opposite side walls thereof, whereby to support a plurality of racks 5 on which the milk bottles 6 are disposed in required numbers.

Arranged in and extending lengthwise of the tank is a pipe 7 formed in its lower side with a series of openings 8, the said pipe, hereinafter termed the spray pipe, being arranged at a distance above the bottles being treated. In the lower portion of the tank, below the positions of the bottle racks, is arranged a longitudinally extending pipe 9, formed with a series of openings 10, said pipe 9 being hereinafter termed the heating pipe.

Beyond the casing is arranged a pump 11 of any appropriate type, and in communication with said pump and supported on a plane above the same is a tank 12, hereinafter termed the hot water storage tank. The tank 12 is in communication with the pump through pipes 13 and 14 provided respectively with valves 15 and 16, the arrangement of the pipes with respect to the tank and to the pump providing for the circulation between the tank and pump when desired.

A water pipe 17 leads from the pump to the spray pipe 7, said pipe 17 being connected intermediate the pump and spray pipe with a cold water supply pipe 18 leading from any suitable source of water supply. The pipe 18 is provided with a control valve 19 and the water pipe 17 with control valves 20 and 21 arranged respectively between the pump and supply pipe 18 and between the latter and spray pipe 7. A steam supply pipe 22 leading from any suitable source opens into the coupling 23 at the juncture of the water pipe 17 and spray pipe 7 in the form of a jet nozzle 24, said steam supply pipe having a control valve 25 adjacent the nozzle. The steam supply pipe is also in communication beyond the nozzle and through the medium of the pipe 26 with the heating pipe 9, a valve 27 controlling this communication in a manner not to interfere with the direct communication between the steam supply and the spray pipe as controlled by the valve 25.

Arranged preferably below the main tank 1 is an auxiliary tank 28 hereinafter termed the cold water storage tank, this tank being in communication with the tank 1 through the bottom of the latter by means of the valve controlled pipe 29, the cold water storage tank being also in communication with the pump 11 through a pipe 30. The pump is also in direct open communication with the tank 1 through the medium of the pipe 31 having a valve 32 therein, and the tank is provided with a drain outlet 33 for obvious purposes.

In the use of the apparatus after a sufficient or desired number of bottles have been placed in the tank 1 in the manner described, the valve 19 is opened, as is also the valve 21 and water admitted through the spray pipe 7 to the interior of the tank, the spray thus produced being thrown on to and running down the sides of each bottle. After admitting the water valve 25 is opened and steam jetted into the spray pipe, with the effect to gradually heat the water and deliver it to the bottles in increasing degrees of heat. When sufficient water has accumulated in the bottom of the tank, sufficient for example to cover the heating pipe 9, the valve 19 is closed and the valve 20 is opened, the valves 27 and 32 being also opened. The steam is thus admitted to the heating pipes to raise the temperature of the water in the bottom of the tank and the pump, being started circulates this heated water in its gradually increasingly heated condition on to the bottles and through the tank. After the milk has been subjected to the proper degree of heat for the desired length of time, the valve 20 is closed and valve 15 opened, so that the water from the main tank is pumped into the heated water storage tank 12. After the heated water has been pumped from the tank 1, the valve 15 is closed and the pump stopped. Valves 19 and 21 are then opened and water admitted directly from the main source of supply to the tank to cool the bottle. As the water thus admitted passes through the spray pipe 7, it is obvious that owing to the heated condition of said pipe, the water will be initially heated and gradually cooled, thereby properly cooling the bottles without the liability of breaking them. After a sufficient quantity of water has been admitted to the main tank for circulating purposes, the supply is shut off by closing the valve 19, and the valves 21 and 32 being then open and the pump started, the cold water is circulated exactly as described in connection with the heated water until the proper cooling of the milk is had. The cold water after its use in the main tank is drawn into the cold water storage tank, from which after subsequent use, it is taken by the pump being maintained at the desired degree of low temperature in the cold water storage tank by any suitable means for cooling.

It is preferred that in the apparatus each bottle be supplied with a metal cap or other means of protecting the usual paper disk stopper, so as to prevent softening of the latter or any liability of contaminating the contents of the bottle.

By reason of the conservation of the heating and chilling mediums, there is a material saving in time owing to the less time required in bringing such mediums to their desired high and low temperatures, and by reason of such economy of time the apparatus is more effective as it permits practically a continuous pasteurizing action.

What is claimed is:

1. A pasteurizing apparatus including a tank, a spray pipe arranged in the upper portion thereof, means for circulating water taken from bottom of tank up through the spray pipe, a heating pipe in the lower portion of the tank adapted to be submerged by a head of water therein, and a steam supply in communication with the spray pipe and the heating pipe, whereby both the ingoing and outgoing water is heated during its circulatory movement.

2. A pasteurizing apparatus including a main tank, a hot water storage tank, a cold water storage tank, a pump, independent means of circulation between the pump and main tank, independent means of circulation between the pump and hot water storage tank, and a communication between the pump and main tank through the cold water storage tank.

3. A pasteurizing apparatus including a tank, a spray pipe arranged in the upper portion thereof, means for circulating water taken from the bottom of tank up through said spray pipe, a heating pipe in the lower portion of the tank adapted to be submerged by a head of water therein, and a steam supply having independently controlled communication with the spray and heating pipes, whereby either or both the ingoing and outgoing water may be heated during its circulatory movement.

4. A pasteurizing apparatus including a main tank, a spray pipe arranged in the upper portion thereof, a heating pipe arranged in the lower portion thereof, a pump, a pipe leading from the pump to the spray pipe, a second pipe leading from the pump to the main tank, a water supply pipe leading to the pipe between the pump and spray pipe, a steam pipe, a nozzle forming the terminal thereof, and opening into and in line with the spray pipe, and a pipe leading from the steam pipe to and in open communication with the heating pipe.

5. A pasteurizing apparatus including a main tank, rack supporting brackets arranged therein, a spray pipe extending longitudinally of the tank above the brackets, a heating pipe extending longitudinally of the tank below the brackets, a pump having circulatory communication with the tank through the spray pipe, means for delivering the fluid to the spray pipe, means for delivering a heating medium to the spray and heating pipe, a hot water storage tank having circulatory communication with the pump, and a cold water storage tank in series circulatory communication with the main tank and pump.

6. A pasteurizing apparatus comprising a main tank, a spray pipe arranged in the upper portion thereof, a heating pipe arranged in the lower portion thereof, a water supply pipe in communication with the spray pipe, a steam pipe in communication with the spray pipe, means for circulating the water from the bottom of tank up through said spray pipe, and a steam pipe in communication with said heating pipe, whereby the temperature of the circulating water may be progressively increased by the admission of steam both to the spray pipe and to the heating pipe.

In testimony whereof I affix my signature in presence of two witnesses.

ROBERT M. CAUFFMAN.

Witnesses:
 HERBERT I. WRIGHT,
 JAMES J. DOCK.